United States Patent [19]
Hirota

[11] Patent Number: 5,366,421
[45] Date of Patent: Nov. 22, 1994

[54] DIFFERENTIAL APPARATUS

[75] Inventor: Isao Hirota, Tochigi, Japan

[73] Assignee: Tochigi Fuji Sangyo Kabushiki Kaisha, Japan

[21] Appl. No.: 57,347

[22] Filed: May 3, 1993

[30] Foreign Application Priority Data

May 6, 1992 [JP] Japan .................................. 4-113451

[51] Int. Cl.⁵ .............................................. F16H 1/445
[52] U.S. Cl. .................................................... 475/231
[58] Field of Search ............... 475/221, 231, 230, 239, 475/238, 149, 150, 154

[56] References Cited

U.S. PATENT DOCUMENTS

| | | | |
|---|---|---|---|
| 4,776,234 | 10/1988 | Shea | 475/150 OR |
| 4,838,118 | 6/1989 | Binkley | 475/150 X |
| 5,019,021 | 5/1991 | Janson | 475/150 OR |
| 5,021,038 | 6/1991 | Beigang | 475/150 X |
| 5,030,181 | 7/1991 | Keller | 475/150 OR |

FOREIGN PATENT DOCUMENTS 62-126645  8/1987  Japan .

Primary Examiner—Dirk Wright
Attorney, Agent, or Firm—Graham & James

[57] ABSTRACT

A differential apparatus comprises: a differential casing driven by an engine; a bevel gear type differential mechanism having pinion shafts, pinion gears, and a pair of side gears one of which is coupled to a first output shaft and the other of which is coupled to a second output shaft; a differential limiting mechanism linked with one of the side gears; and a gear transmission mechanism engaged between the differential limiting mechanism and the other of the side gears. The differential limiting mechanism (clutch or viscous coupling) can be disposed directly between the two side gears without allowing two output shafts to intervene between the two side gears, so that the differential apparatus can be mounted on a vehicle provided with another differential apparatus (e.g., having no differential limiting apparatus) without any design modification of the output shafts.

6 Claims, 6 Drawing Sheets

DIFFERENTIAL APPARATUS

BACKGROUND OF THE INVENTION

The present invention relates to a differential apparatus, and more specifically to a differential apparatus usable in common for two output shafts designed for various type automotive vehicles.

In the differential apparatus for an automotive vehicle, the differential motion (rotation) between two output members (two shafts) is usually larger than that between a differential casing and an output member (shaft). Accordingly, when differential limiting means is provided between the two output shafts, it is possible to obtain not only a relatively large differential limiting force by the differential limiting means of a relatively small size, but also reliable differential limiting characteristics due to an equal transfer ratio on both sides of the output shafts. In the case of the differential apparatus of bevel gear type, however, since side gears are arranged with pinions intervening between the two side gears, it is difficult to directly dispose the differential limiting means between the two side gears, with the result that the differential limiting means is usually disposed between the two output shafts. In this case, however, the length of the output shaft is different from each other on both sides of the differential apparatus, so that there exists a problem in that two output shafts of different lengths are required for the differential apparatus provided with the differential limiting function and therefore it is necessary to change the design of the output shafts whenever mounted on the already existing vehicles having another differential apparatus provided with no differential limiting function.

To overcome the above-mentioned problem, a differential apparatus as shown in FIG. 1 has been proposed in Japanese Published Unexamined (Kokai) Utility Model Application No. 62-126645, in which an intermediate link shaft 211 is provided between the two output shafts 217 and 219. In more detail, in this differential apparatus 201, the differential motion of a bevel gear type differential mechanism 205 is limited by a viscous coupling 203. That is, one side gear 207 is linked with a left side output shaft 217 via a housing 209 of the viscous coupling 203, and the other side gear 213 is linked with a right side output shaft 219 and an intermediate link shaft 211 fixed to a hub 215 of the viscous coupling 203. In this prior art differential apparatus, however, since the intermediate link shaft 211 is disposed between the left side output shafts 217 linked with the side gear 207 and the right side output shaft 219 linked with the side gear 213, a wide space is required between the two output shafts 217 and 219. Further, although the axial length of the output shaft 217 is equal to that of the output shaft 219, the length thereof is relatively short, it is impossible to use the two output shafts of this differential apparatus in common for the two output shafts of other differential apparatuses provided with no differential limiting function, for instance.

SUMMARY OF THE INVENTION

With these problem in mind therefore, it is the primary object of the present invention to provide a differential apparatus, by which differential limiting means can be disposed between the two side gears of a differential mechanism of bevel gear type, without intervention of any additional output shaft, so that the output shafts are usable in common for other differential apparatuses of different type without modifying the two output shafts of the already existing vehicles.

To achieve the above-mentioned object, a differential apparatus according to the present invention comprises: (a) a differential casing (21) driven by an engine; (b) a bevel gear type differential mechanism (31) having: (1) pinion shafts (35) extending radially and supported within said differential casing; (2) pinion gears (37) rotatably supported by said pinion shafts, respectively; and (3) a pair of side gears (39, 41) disposed on both sides of said pinion shafts and in mesh with said pinion gears respectively, one of said side gears being coupled to a first output shaft and the other of said side gears being coupled to a second output shaft; (c) differential limiting means (55, 103) linked with one (41) of said side gears; and (d) gear transmission means (67, 121, 133) engaged between said differential limiting means and the other (39) of said side gears.

The gear transmission means (67) is a plurality of rod-shaped gears (59) extending axially and disposed between two of said pinion shafts, one end of each of said gears being in mesh with a gear (65) formed in said differential limiting means and the other end of each of said gears being in mesh with another gear (63) formed in the other (39) of said side gears. Each of said rod-shaped gears (59) is a spur gear or a helical gear.

The differential limiting means comprises: (a) a main clutch (55) disposed between one (41) of said side gears and said gear transmission means (67); (b) a pilot clutch (79) linked with said differential casing; (c) a ball cam mechanism (73) disposed between said main clutch and said pilot clutch; and (d) an electromagnet (89) for engaging said pilot clutch to allow said ball cam mechanism to generate a thrust force which engages said main clutch for providing a differential limiting force. Alternatively, the differential limiting means is a viscous coupling disposed between one (41) of said side gears and said gear transmission means.

In the differential apparatus according to the present invention, since the two side gears of the bevel type differential mechanism is coupled with each other via the differential limiting means and the gear transmission means, in such a way that one rotating member of the differential limiting means (clutch or viscous coupling) is fixed to one side gear and the other rotating member thereof is engaged with the other side gear via the gear transmission mechanism (rod-shaped gears), it is possible to provide the differential limiting function between the two side gears linked with two output shafts, without exerting any influence upon the dimensional factors of the two output shafts.

Therefore, the differential apparatus of the present invention can be mounted on any other vehicles provided with another differential apparatus having no differential limiting function, without any design modification or the output shafts. Further, when the helical gears are used for the gear transmission means, since a thrust force can be generated due to the frictional force of the helical gears, it is possible to generate a larger differential limiting force in addition to the differential limiting means. Furthermore, when the rotational speed of differential motion is increased by the gear transmission mechanism, it is possible to further increase the differential limiting force.

DETAILED DESCRIPTION OF THE PREFERRED EMBODIMENTS

The differential apparatus of the present invention will be described hereinbelow with reference to the attached drawings.

Figure 1:
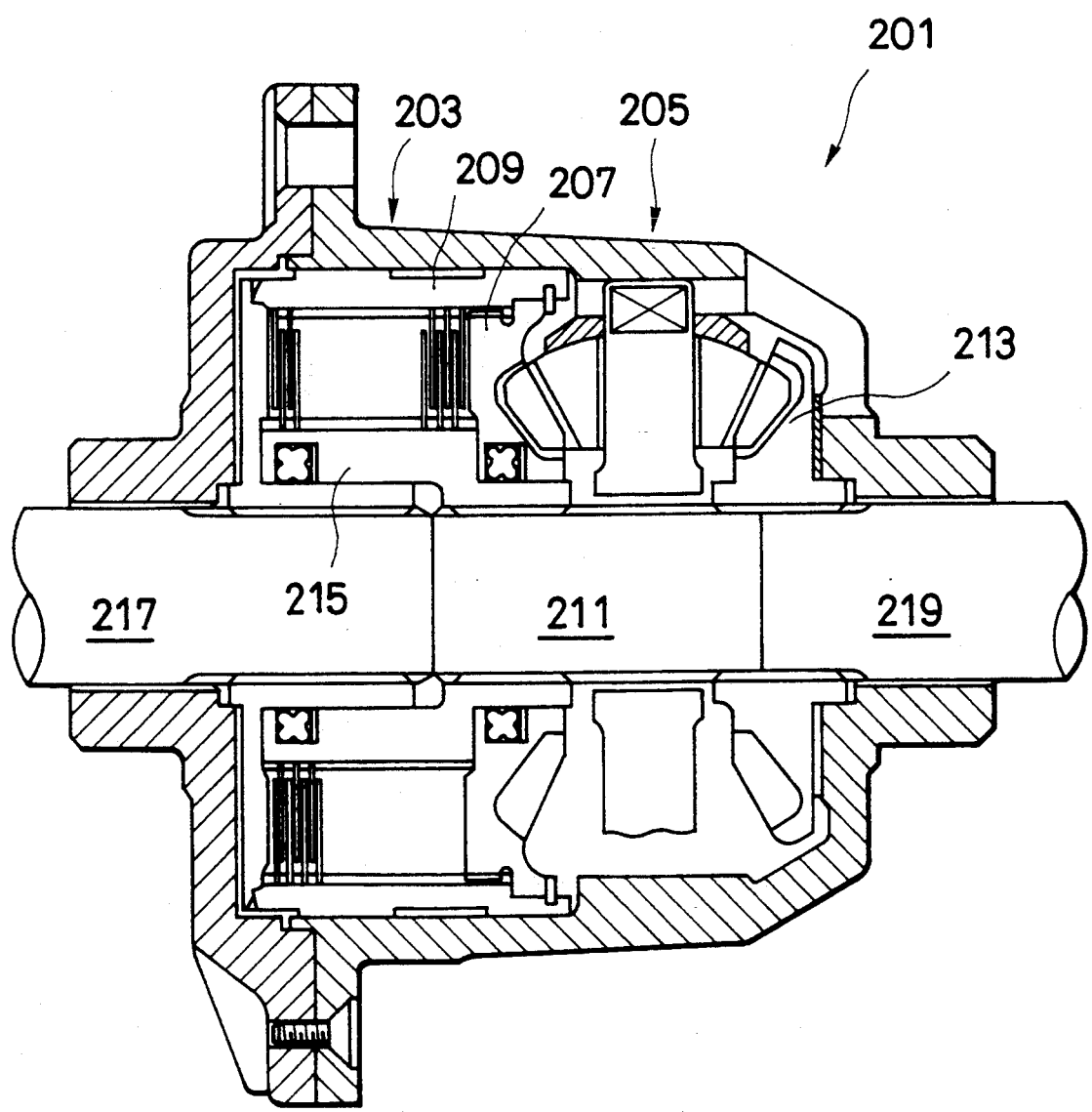
FIG. 1 is a cross-sectional view showing a prior art differential apparatus.
Figure 2:
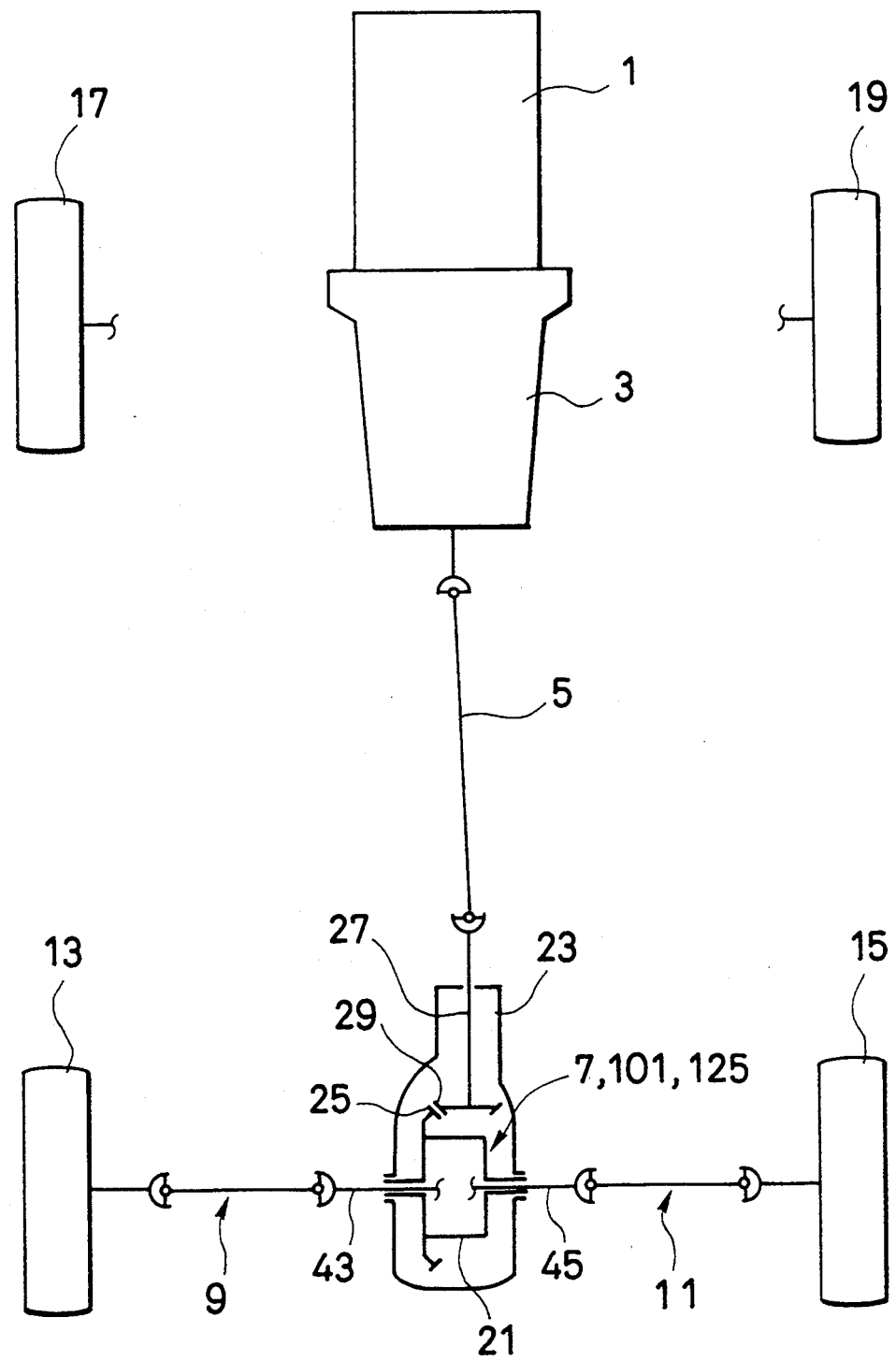
FIG. 2 is a skeleton diagram showing an example of power systems of automotive vehicles, to which the differential apparatus according to the present invention is mounted.

FIG. 2 shows a power system of an automotive vehicle by way of example, to which the embodiments of the differential apparatus according to the present invention is mounted. In FIG. 2, the power system is composed of an engine 1, a transmission 3, a propeller shaft 5, a rear differential 7 (which corresponds to the differential apparatus of the present invention), two rear wheel shafts 9 and 11, two rear wheels 13 and 15, two front wheels 17 and 19, etc. A casing 21 of the rear differential 7 is rotatably disposed within a differential carrier 23. A ring gear 25 fixed to the differential casing 21 is in mesh with a drive pinion gear 29 fixed to a drive pinion shaft 27. This drive pinion shaft 27 is coupled with a propeller shaft 5. Therefore, when the engine 1 is driven, the differential casing 21 is rotated by the engine power.

Figure 3A:
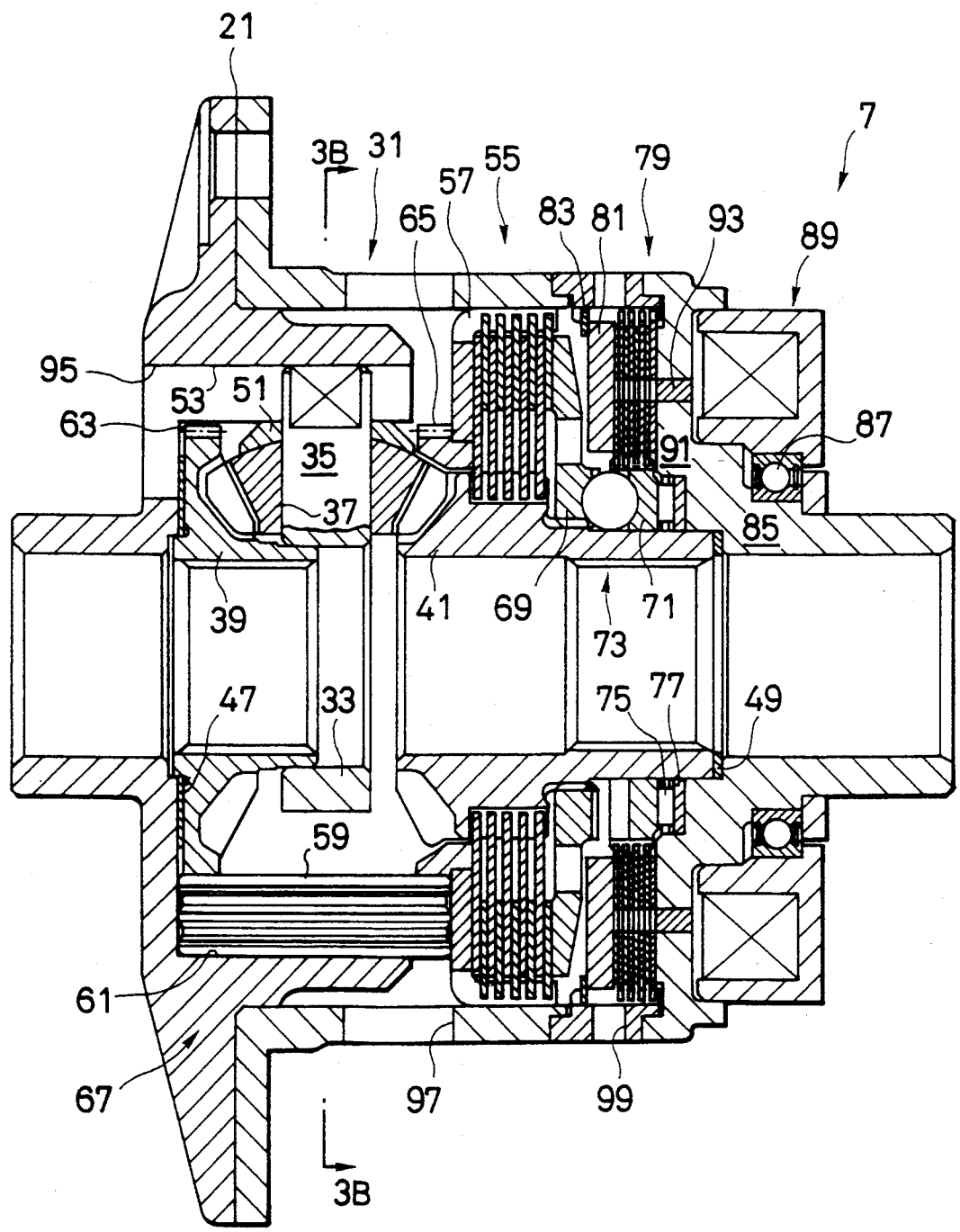
FIG. 3A is a cross-sectional view showing a first embodiment of the differential apparatus according to the present invention.
Figure 3B:
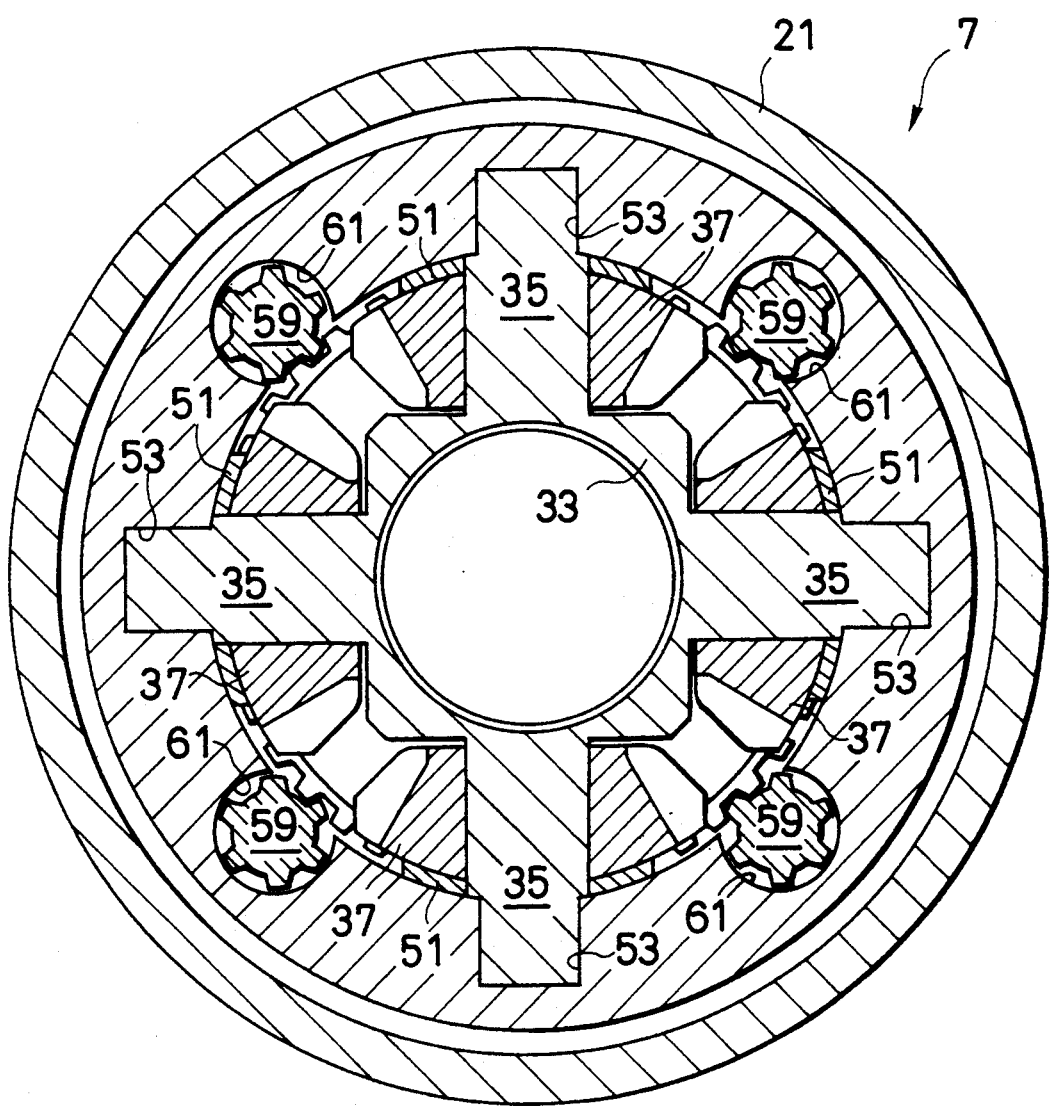
FIG. 3B is a cross-sectional view taken along the line 3B—3B in FIG. 3A.

FIGS. 3A and 3B show a first embodiment of the differential apparatus according to the present invention. The right and left direction shown in FIG. 2 matches that shown in FIG. 3A.

In FIG. 3A, the differential apparatus is roughly composed of a differential casing 21, a differential mechanism 31 of bevel type, a main clutch (differential limiting means) 55, a gear transmission mechanism 67, a ball cam mechanism 73, a pilot clutch 79, an electromagnet 89, etc.

The differential mechanism 31 disposed within a differential casing 21 comprises four pinion shafts 35 arranged in an inner circumferential surface at regular angular intervals so as to extend radially and supported by a boss 33 as shown in FIG. 3B; four pinion gears 37 rotatably supported by the respective pinion shafts 35; and two side gears 39 and 41 disposed on both sides of the pinion shafts and in mesh with the respective pinion gears 37. The left side gear 39 is spline coupled with the output shaft 43 connected to the left side rear wheel shaft 9 (both shown in FIG. 2), and the right side gear 41 is spline coupled with the output shaft 45 connected to the right side rear wheel shaft 11 (both shown in FIG. 2). A washer 47 is disposed between the side gear 39 and differential casing 21, and another washer 49 is disposed between the side gear 41 and differential casing 21. Further, spherical washers 51 are disposed between the respective pinion gears 37 and the differential casing 21, respectively. The pinion shafts 35 are engaged with axially extending grooves 53 formed in the inner circumferential surface of the differential casing 21.

When the engine 1 is driven, an engine power is transmitted to the differential casing 21, distributed to the two side gears 39 and 41 via the four pinion shafts 35 and the four pinion gears 37, respectively, and further transmitted to the rear wheels 13 and 15 via the two output shafts 43 and 45, respectively. Further, when there exists a difference in driving resistance between the two rear wheels 13 and 15, the driving power of the engine 1 is differentially distributed to the rear right and left wheels 13 and 15, respectively, due to the rotations of the pinion gears 37 on their own axes and around the two side gears 39 and 41.

On the right side of the differential mechanism 31, the main clutch 55 of multi-disk type is disposed as the differential limiting means. This main clutch 55 is provided between a clutch housing 57 and the right side gear 41.

The gear transmission mechanism 67 is disposed between this clutch housing 57 and the left side gear 39. In more detail with reference to FIGS. 3A and 3B, four rod-shaped transmission gears 59 are provided between two adjacent pinion shafts 35 and rotatably supported in four cylindrical axially extending grooves 61 formed in the inner surface of the differential casing 21. One end of each of these transmission gears 59 is in mesh with a gear 63 formed in the outer circumferential surface of the left side gear 39, and the other end of each of these transmission gears 59 is in mesh with a gear 65 formed in an outer circumferential surface of the clutch housing 57, as shown in FIG. 3A.

Therefore, the differential rotation between the two side gears 39 and 41 can be connected via the gear transmission mechanism 67 (i.e., the gears 59) and the main clutch 55, and thereby limited by the engage force of the main clutch 55 via the gear transmission mechanism 67, so that it is possible to establish a differential limiting function between the two side gears 39 and 41 or two output shafts 43 and 45 spline coupled to the side gears 39 and 41, without exerting any dimensional influence upon the two output shafts 43 and 45.

In the main clutch 55, a push member 69 is spline coupled with the right side gear 41 so as to be shiftable in the axial direction. A cam ring 71 is disposed on the right side of the push member 69. A ball cam mechanism 73 is formed between the push member 69 and the cam ring 71. Further, a bearing 75 and a washer 77 are disposed between the cam ring 71 and the differential casing 21 so as to receive a reactive thrust force of the ball cam mechanism 73.

The multi-disk type pilot clutch 79 is disposed between the cam ring 71 and the differential casing 21. On the left side of the pilot clutch 79, an armature 81 is disposed and further located by a retainer 83. The ring-shaped electromagnet 89 is supported on a right side boss portion 85 of the differential casing 21 via a bearing 87, and further fixed to the differential carrier 23 (see FIG. 2). Further, a stainless steel ring 93 is disposed in a right side wall 91 of the differential casing 21 to prevent the magnetic flux of the electromagnet 89 from being shorted and further to guide the magnetic flux to the armature 81. Therefore, when the electromagnet 89 is energized, the electromagnet 89 extracts the armature 81 to engage the pilot clutch 79.

Further, the differential casing 21 is formed with openings 95, 97 and 99. Lubricant is introduced into the differential carrier 23 through these openings 95, 97 and 99 to lubricate the differential mechanism 31, the gear transmission mechanism 67, and the respective clutches 55 and 79.

The operation of the differential apparatus thus constructed will be described hereinbelow.

When the pilot clutch 79 is engaged, the differential motion between the differential casing 21 and the side gear 41 is limited due to the engaging force of the pilot clutch 79. At the same time, a differential torque between the differential casing 21 and the side gear 41 is applied to the ball cam mechanism 73, so that the main clutch 55 is engaged due to a thrust force of the ball cam mechanism 73. Once the main clutch 55 is engaged, the differential motion between the two side gears 39 and 41 is limited largely by the main clutch 55 and via the gears 59, so that it is possible to obtain a large differential limiting force.

As described above, since the differential motion of the differential mechanism 81 can be limited appropriately by the two respective clutches 55 and 79, in case one of the rear wheels 13 and 15 rotates idle on a bad (muddy) road, since a driving power can be transmitted to the other wheel via the rear differential apparatus 7, it is possible to drive the vehicle on a bad road, thus improving the travelling characteristics on muddy roads. When the engaging force of the pilot clutch 79 is sufficiently large, since the differential motion is locked, it is possible to improve the travelling stability on a straight road. Further, when the pilot clutch 79 is slipped appropriately during the differential motion, it is possible to turn the vehicle smoothly and stably. However, when the pilot clutch 79 is released, since the thrust force of the ball cam mechanism 73 is reduced, the main clutch is also released, so that the vehicle is free from the differential motion.

As described above, in the differential apparatus according to the present invention, since the differential function between the two shafts or the two side gears can be established via the clutch mechanism 55 and 79 and the gear transmission mechanism 67, irrespective of the axial lengths of the two output shafts 43 and 45, the two output shafts 43 and 45 are free from the dimensional restriction. In other words, the output shafts 43 and 45 of the differential apparatus according to the present invention can be used in common for various differential apparatuses, irrespective of the presence or absence of the differential limiting means. That is, it is unnecessary to replace the output shafts with other ones of different sizes, when the vehicle has been modified. In addition, since a large differential limiting force can be obtained between the right and left shafts, the respective clutches 55 and 79 can be reduced in size and load, and also the durability of the clutches can be improved.

Figure 3C:
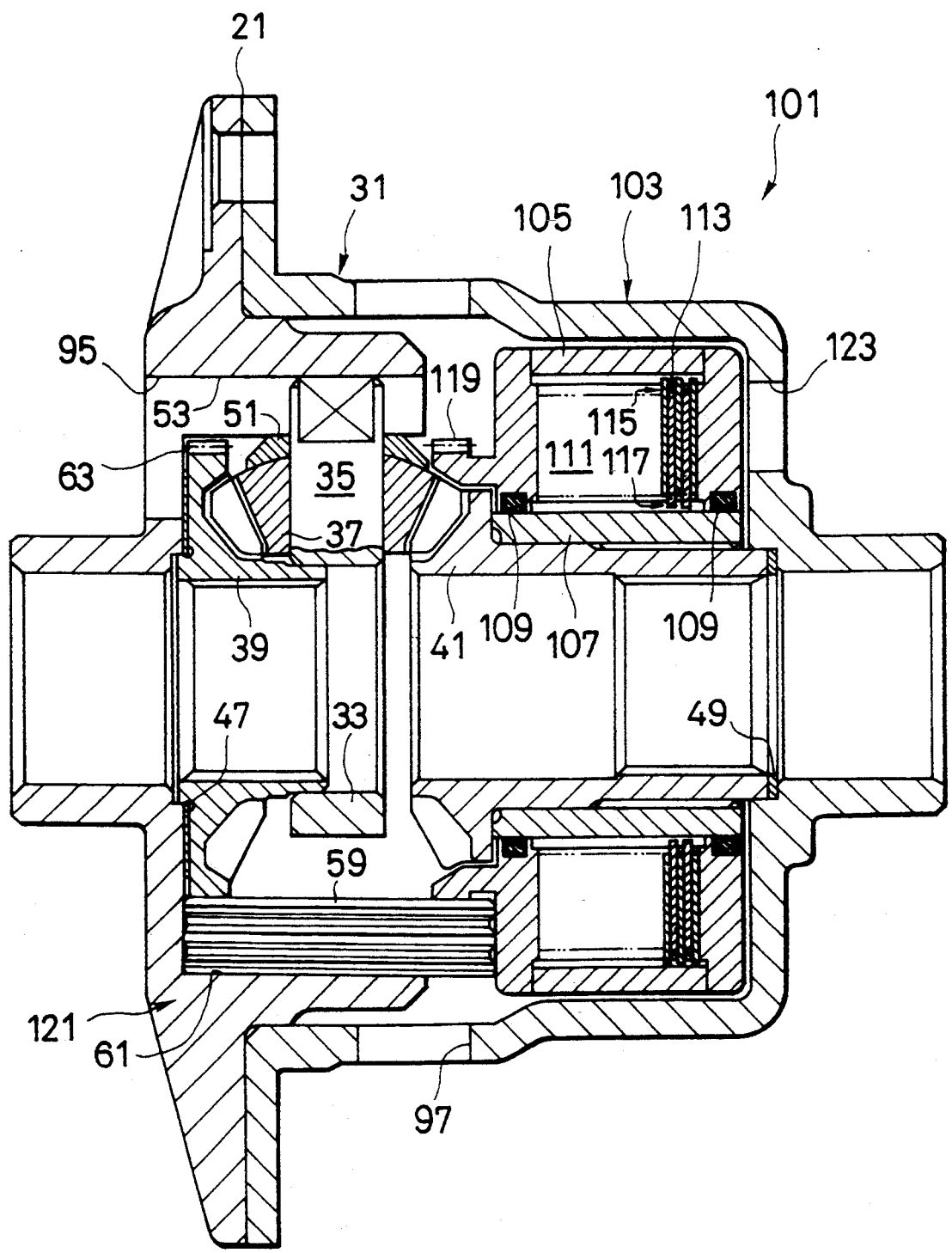
FIG. 3C is a cross-sectional view showing a modification of the first embodiment of the differential apparatus according to the present invention.

A modification of the first embodiment will be described with reference to FIG. 3C, in which the differential apparatus 101 comprises a viscous coupling as the differential limiting means, instead of the multi-disk clutch. In FIG. 3C, the same-reference numerals have been retained for the similar parts or elements which have the same functions as with the case the first embodiment shown in FIGS. 3A and 3B.

The viscous coupling 103 (differential limiting means) is disposed on the right side of the differential mechanism 31. The viscous coupling 103 is composed of a housing 105, a hub 107, a plurality of outer plates 115 engaged with the housing 105, and a plurality of inner plates 117 engaged with the hub 107. The inner and outer plates 117 and 115 are arranged alternately with spacers 113 sandwiched therebetween within a pressure chamber 111 formed between the housing 105 and the hub 107 in juxtaposition with respect to each other. The pressure chamber 111 is sealed by two X-shaped rings 109 and filled with silicon oil. The differential motion between the housing 105 and the hub 107 can be limited by the shearing resistance between the outer and inner plates 115 and 117 with the silicon oil intervening therebetween. The differential limiting force increases with increasing rotational speed of the differential motion of the differential mechanism.

Within the differential casing 21, the differential mechanism 31 is disposed. The gear transmission mechanism 121 is disposed in the same way as in the first embodiment shown in FIGS. 3A and 3B. That is, the four transmission gears 59 extending in the axial direction are disposed between the two adjacent pinion shafts 35. The left end of each of the transmission gears 59 is in mesh with the gear 63 formed in the outer circumferential surface of the left side gear 39. The right end of each of the transmission gears 59 is in mesh with the gear 119 formed in the outer circumferential surface of the housing 105. The hub 107 is spline coupled to the right side gear 41.

The differential limiting force of the viscous coupling 103 limits the differential motion of the two side gears 39 and 41 via the gear transmission mechanism 121. In the vehicle as shown in FIG. 2, in case one of the rear wheels 13 and 15 rotates idle, since the engine power is transmitted to the other of the rear wheels via the rear differential apparatus 101 of the present invention on the basis of the differential limiting force of the viscous coupling 103, it is possible to improve the traveling characteristics on a muddy road. Further, since the differential rotation generated between the two rear wheels 13 and 15 is gently limited by the viscous coupling 103, it is possible to turn the vehicle smoothly and stably. Further, lubricant is introduced into the differential casing 21 through the openings 95, 97 and 123 to lubricate the inner parts arranged within the differential casing 21.

In this modification, since the differential limiting function between the two output shafts can be established, irrespective of the lengths of the output shafts 43 and 45, it is possible to use the output shafts 43 and 45 in common for various differential apparatuses, irrespective of the presence or absence of the differential limiting means. In addition, since a large differential limiting force can be obtained between the right and left shafts, the viscous coupling 103 can be reduced in size and a strong differential limiting force can be obtained.

Figure 4:
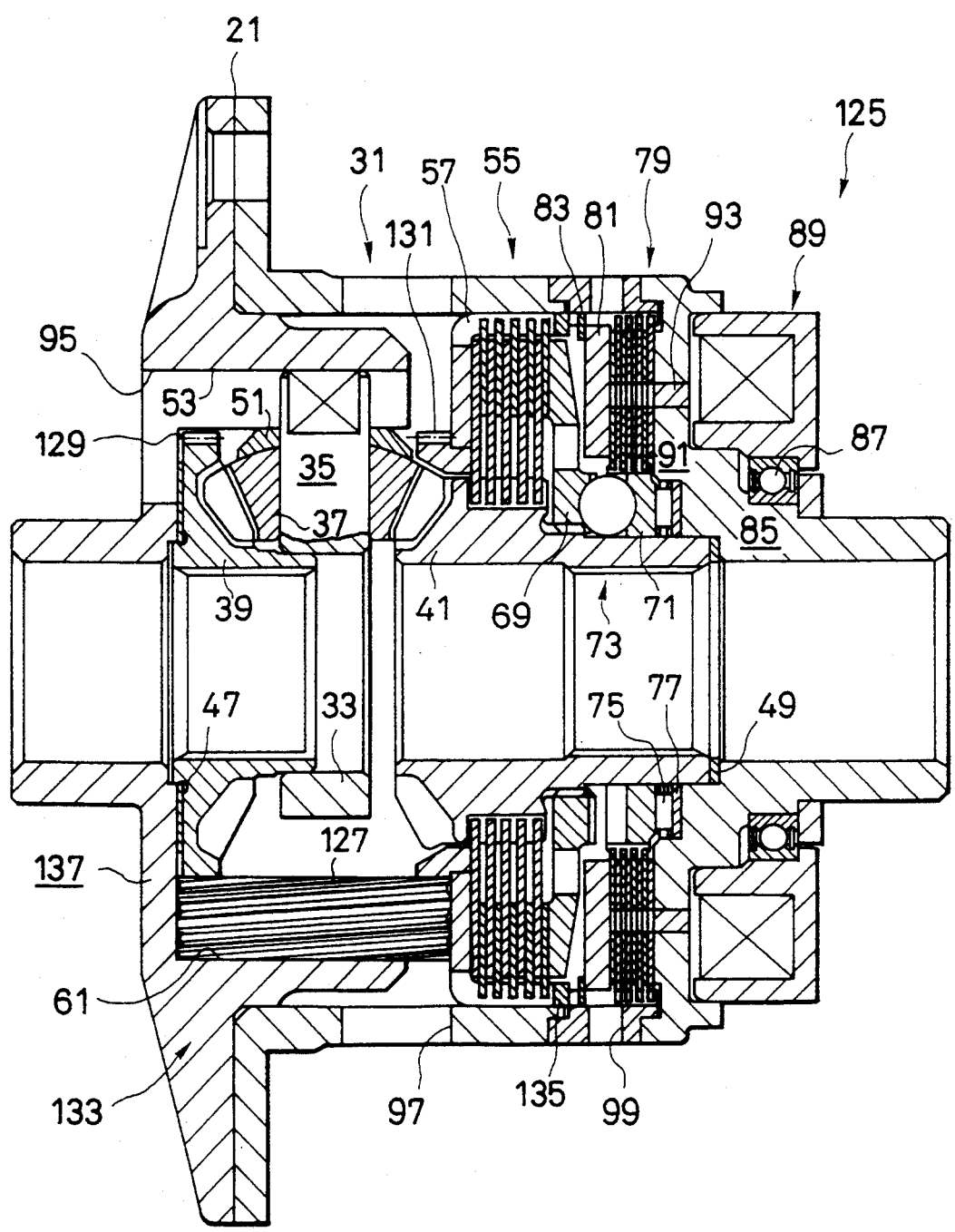
FIG. 4 is a cross-sectional view showing a second embodiment of the differential apparatus according to the present invention.

The second embodiment will be described with reference to FIG. 4, in which the differential apparatus 125 comprises a gear transmission mechanism 133 of helical gears in order to further increase the differential limiting force. In FIG. 4, the same reference numerals have been retained for the similar parts or elements which have the same functions as with the case the first embodiment shown in FIGS. 3A and 3B.

In the same way as in the first embodiment, the differential apparatus 125 is composed of the differential mechanism 31, the main clutch 55, the pilot clutch 79 and the electromagnet 89. Four rod-shaped transmission gears 127 are provided between two adjacent pinion shafts 35 and rotatably supported in four cylindrical axially extending grooves 61 formed in the inner surface of the differential casing 21. The left end of each of these transmission gears 127 is in mesh with a gear 129 formed on the outer circumferential surface of the left side gear 39, and the right end of each of these transmission gears 127 is in mesh with a gear 131 formed in the outer circumferential surface of the clutch housing 57, as shown in FIG. 4, to construct the gear transmission mechanism 133. The feature of this second embodiment is to form the gears 127, 129 and 131 by helical thread. Further, within the differential casing 21, a thrust washer 135 is additionally provided to protect the main clutch 55 from an excessively large thrust force of the helical gear transmission mechanism 133.

When the transmission gears 127 rotate due to the differential torque, the thrust force is generated due to the engagement between the helical gear transmission mechanism 133 and the gears 129 of the side gear 39, the gear 131 of The clutch housing 57, so that the end surface of the transmission gear 127 is brought into pressure contact with either one of the left side wall 137 of the differential casing 21 or the clutch housing 57 in dependence upon the rotational direction of the transmission gear 127. Therefore, it is possible to obtain a large differential limiting force on the basis of the frictional force therebetween.

As described above, in this second embodiment, it is possible to obtain further larger differential limiting force due to the helical gear transmission mechanism 133, in addition to the differential limiting force due to the two clutches 55 and 79. Further, it is also possible to use the output shafts in common with the other differential apparatuses of different types.

Further, in the first and second embodiments, when the rotational speed of the differential motion of the gear transmission mechanism is increased by an appropriate speed-increasing gear mechanism, it is possible to obtain a further larger differential limiting force.

As described above, in the differential apparatus according to the present invention, since both the side gears 39 and 41 are linked with each other via the differential limiting means 55 and 103 and the transmission gears 67, 121 and 133 disposed between the two adjacent pinion shafts 35, it is possible to establish the differential limiting function between the two output shafts irrespective of the axial lengths of the output shafts. Therefore, the two output shafts can be used in common for various other differential apparatuses of different types, thus eliminating the design modification so far required when the differential apparatus provided with no differential limiting function is assembled on the automotive vehicle. Further, in the second embodiment, since the helical gear transmission mechanism is used, it is possible to obtain still a larger differential limiting force by the frictional force generated by the thrust force of the helical gear transmission mechanism.

What is claimed is:

1. A differential apparatus comprising:
   (a) a differential casing driven by an engine;
   (b) a bevel gear type differential mechanism having:
      (i) pinion shafts extending radially and supported within said differential casing;
      (ii) pinion gears rotatably supported by said pinion shafts, respectively; and
      (iii) a pair of side gears disposed on both sides of said pinion shafts and in mesh with said pinion gears respectively, one of said side gears being coupled to a first output shaft and the other of said side gears being coupled to a second output shaft;
   (c) differential limiting means linked with one of said side gears; and
   (d) gear transmission means engaged between said differential limiting means and the other of said side gears.

2. A differential apparatus comprising:
   (a) a differential casing driven by an engine;
   (b) a bevel gear type differential mechanism having:
      (i) pinion shafts extending radially and supported within said differential casing;
      (ii) pinion gears rotatably supported by said pinion shafts, respectively; and
      (iii) a pair of side gears disposed on both sides of said pinion shafts and in mesh with said pinion gears respectively, one of said gears being coupled to a first output shaft and the other of said side gears being coupled to a second output shaft;
   (c) differential limiting means linked with one of said side gears; and
   (d) rod-shaped gears engaged between said differential limiting means and the other of said side gears, said rod-shaped gears extending axially and disposed between two of said pinion shafts, one end of each of said rod-shaped gears being in mesh with a gear formed in said differential limiting means and the other end of each of said rod-shaped gears being in mesh with another gear formed in the other of said side gears.

3. A differential apparatus of claim 2, wherein each of said rod-shaped gears is a spur gear.

4. A differential apparatus of claim 2, wherein each of said rod-shaped gears is a helical gear.

5. A differential apparatus comprising:
   (a) a differential casing driven by an engine;
   (b) a bevel gear type differential mechanism having:
      (i) pinion shafts extending radially and supported within said differential casing;
      (ii) pinion gears rotatably supported by said pinion shafts, respectively; and
      (iii) a pair of side gears disposed on both sides of said pinion shafts and in mesh with said pinion gears respectively, one of said gears being coupled to a first output shaft and the other of said side gears being coupled to a second output shaft;
   (c) differential limiting means linked with one of said side gears; and
   (d) gears transmission means engaged between said differential limiting means and the other of said side gears wherein said differential limiting means has a main clutch disposed between one of said side gears and said gear transmission means, a pilot clutch linked with said differential casings, a ball cam mechanism disposed between said main clutch and said pilot clutch, and an electromagnet for engaging said pilot clutch to allow said ball cam mechanism to generate a thrust force which engages said main clutch for providing a differential limiting force.

6. A differential apparatus of claim 2, wherein said differential limiting means is a viscous coupling disposed between one of said gears and said gear transmission means.

* * * * *